(12) United States Patent
Lescure et al.

(10) Patent No.: US 8,308,302 B2
(45) Date of Patent: Nov. 13, 2012

(54) LASER SCANNING IMAGING SYSTEM WITH REDUCED SPECKLE

(75) Inventors: Alban N. Lescure, Redmond, WA (US); Markus Duelli, Seattle, WA (US); Mark O. Freeman, Snohomish, WA (US)

(73) Assignee: Microvision, Inc., Redmond, WA (US)

( * ) Notice: Subject to any disclaimer, the term of this patent is extended or adjusted under 35 U.S.C. 154(b) by 270 days.

(21) Appl. No.: 12/835,028

(22) Filed: Jul. 13, 2010

(65) Prior Publication Data

US 2012/0013855 A1    Jan. 19, 2012

(51) Int. Cl.
G03B 21/28 (2006.01)
G03B 21/26 (2006.01)
G02B 26/08 (2006.01)
H01S 3/10 (2006.01)

(52) U.S. Cl. ............... 353/31; 353/81; 353/99; 353/37; 359/201.1; 372/24

(58) Field of Classification Search ............... 353/31, 353/81, 98, 99, 30, 37; 359/201.1; 372/24
See application file for complete search history.

(56) References Cited

U.S. PATENT DOCUMENTS

| 5,614,961 | A | 3/1997 | Gibeau et al. |
| 7,572,015 | B2* | 8/2009 | Kobayashi et al. ............ 353/102 |
| 2005/0046829 | A1 | 3/2005 | Clark et al. |
| 2006/0023164 | A1* | 2/2006 | Sakaguchi et al. ............... 353/20 |
| 2008/0218699 | A1* | 9/2008 | Lapchuk et al. ................ 353/31 |
| 2009/0168818 | A1 | 7/2009 | Gollier et al. |
| 2010/0080253 | A1* | 4/2010 | Masood .......................... 372/26 |
| 2010/0315597 | A1* | 12/2010 | Powell et al. .................... 353/20 |

* cited by examiner

*Primary Examiner* — Georgia Y Epps
*Assistant Examiner* — Magda Cruz
(74) *Attorney, Agent, or Firm* — Kevin D. Wills (57) ABSTRACT

An imaging system (200) is configured to reduce perceived speckle (106) in images (201) by introducing angular diversity into consecutively projected images. The imaging system (200) includes one or more laser sources (203) that are configured to produce one or more light beams (215). A light modulator (204) scans these light beams (215) to produce images. A light translation element (206) introduces the angular diversity by physically altering a light reception location (208) on the light modulator (204) between refresh sweeps. To preserve image stability, image data (220) in a memory (218) can be correspondingly shifted.

4 Claims, 8 Drawing Sheets

LASER SCANNING IMAGING SYSTEM WITH REDUCED SPECKLE

CROSS REFERENCE TO PRIOR APPLICATIONS

This application is related to commonly assigned U.S. application Ser. No. 12/835,037, entitled "Alternating Beam Laser Imaging System with Reduced Speckle," filed concurrently herewith by the same inventors, which is incorporated herein by reference for all purposes.

BACKGROUND

1. Technical Field

This invention relates generally to scanned laser projection systems, and more particularly to a scanned, laser-based system employing angular diversity by moving the physical position of a light beam delivered to a light modulator to reduce speckle perceived by a viewer.

2. Background Art

Laser projection devices facilitate the production of brilliant images created with vibrant colors. Laser projection systems are generally brighter, sharper, and have a larger depth of focus than do conventional projection systems. Further, the advent of semiconductor lasers and laser diodes allows laser projection systems to be designed as compact projection systems that can be manufactured at a reasonable cost. These systems consume small amounts of power, yet deliver bright, complex images.

One practical drawback associated with using lasers in projection systems is the image artifact known as "speckle." Speckle occurs when a coherent light source is projected onto a randomly diffusing projection surface. Laser light is highly coherent. Accordingly, when it reflects off a rough surface, components of the light combine with other components to form patches of higher intensity light and lower intensity light. In a detector with a finite aperture such as a human eye, these varied patches of intensity appear as "speckles," meaning that some small portions of the image look brighter than other small portions. This spot-to-spot intensity difference can vary depending on observer's position, which makes the speckles appear to change in time when the observer moves.

Figure 1:
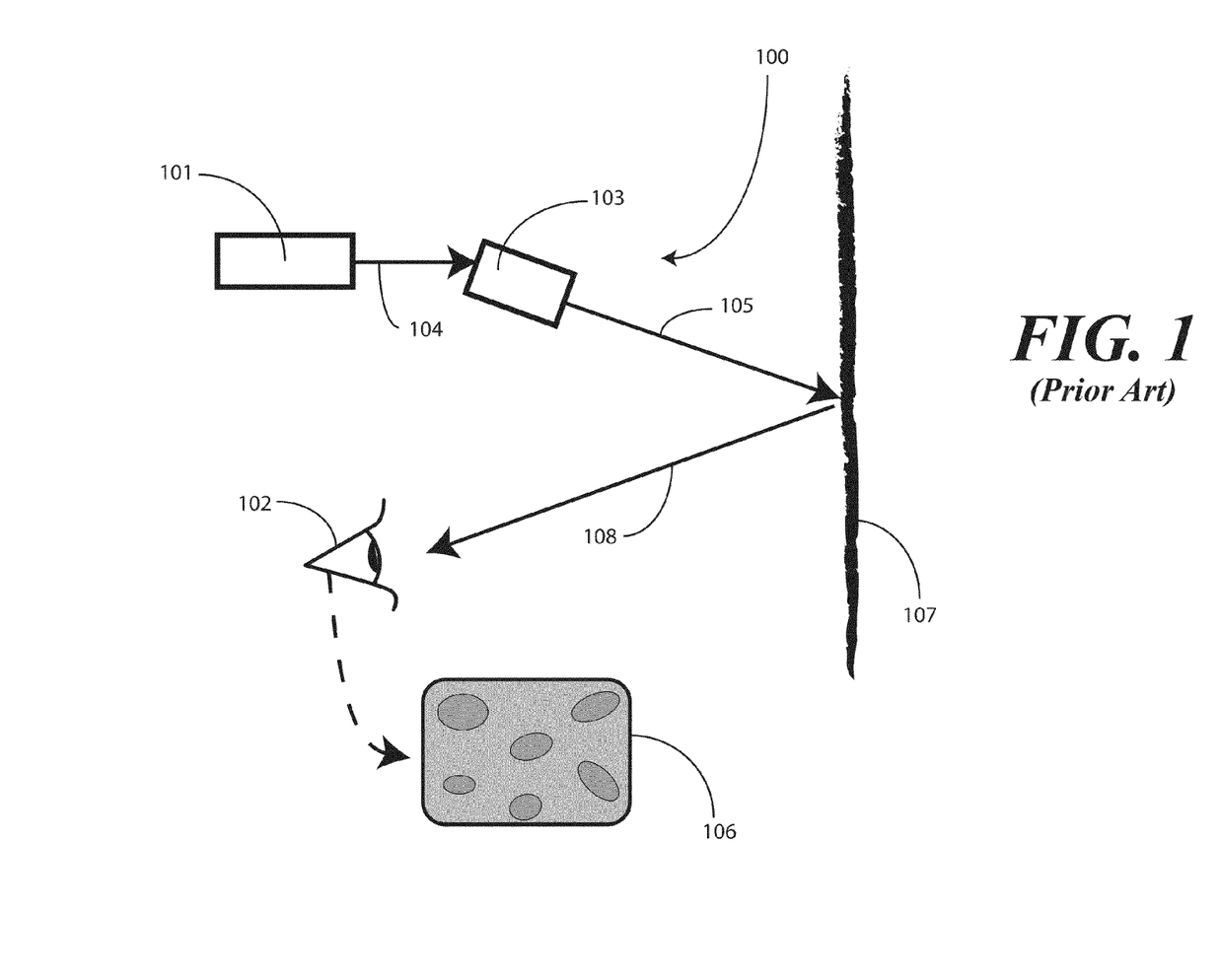
FIG. 1 illustrates a prior art laser projection system.

Turning now to FIG. 1, illustrated therein is a prior art system 100 in which an observer 102 may perceive speckle. Specifically, a coherent light source 101, such as a semiconductor-type or standard laser, delivers a coherent beam 104 to a modulation device 103. The modulation device 103 modulates the coherent beam 104 into a modulated coherent beam 105 capable of forming an image. This modulated coherent beam 105 is then delivered to a projection medium, such as the projection screen 107 shown in FIG. 1.

As the projection screen 107 surface has a random roughness, i.e., as it includes tiny bumps and crevices that are randomly distributed, the reflected light 108 has portions that combine and portions that cancel. As a result, the observer 102 views an image 106 that appears to be speckled. The presence of speckle often tends to perceptibly degrade the quality of the image produced using the laser projection system.

There is thus a need for an improved speckle-reducing system for use with laser-based projection systems such as those employing semiconductor-type lasers.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION OF THE INVENTION

Before describing in detail embodiments that are in accordance with the present invention, it should be observed that the embodiments reside primarily in combinations of method steps and apparatus components related to an imaging system configured to reduce perceived speckle. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

It will be appreciated that embodiments of the invention described herein may be comprised of one or more conventional processors and unique stored program instructions that control the one or more processors to implement, in conjunction with certain non-processor circuits, some, most, or all of the functions of reducing speckle as described herein. The non-processor circuits may include, but are not limited to, microprocessors, scanning mirrors, image modulation devices, memory devices, clock circuits, power circuits, and so forth. As such, these functions may be interpreted as steps of a method to perform speckle reduction. Alternatively, some or all functions could be implemented by a state machine that has no stored program instructions, or in one or more application specific integrated circuits, in which each function or some combinations of certain of the functions are implemented as custom logic. Of course, a combination of the two approaches could be used. It is expected that one of ordinary skill, notwithstanding possibly significant effort and many design choices motivated by, for example, available time, current technology, and economic considerations, when guided by the concepts and principles disclosed herein will be readily capable of generating such programs and circuits with minimal experimentation.

Embodiments of the invention are now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on." Relational terms such as first and second, top and bottom, and the like may be used solely to distinguish one entity or action from another entity or action without necessarily requiring or implying any actual such relationship or order between such entities or actions. Also, reference designators shown herein in parenthesis indicate components shown in a figure other than the one in discussion. For example, talking about a device (10) while discussing figure A would refer to an element, 10, shown in figure other than figure A.

Embodiments of the present invention provide a scanned, laser-based system capable of altering the physical location of a beam along a scanning device between image refresh sweeps to introduce angular diversity into the scanned beam, thereby reducing speckle as perceived by a user. In a simple embodiment, during a first scan of an image, a laser beam is delivered to a scanning device at a first location. During a subsequent scan of the image, the location of the laser beam along the scanning device is shifted. The amount of shift in one embodiment is an integer multiple of a pixel, although the shift can be a partial pixel as well. To preserve image focus and resolution, the image data in a buffer being used to control scanning is shifted a corresponding amount. The result is the introduction of angular diversity in the laser beam between the first sweep and second sweep. A stable image with reduced speckle results.

In accordance with embodiments of the invention, the physical location of the laser beam can be shifted two, three, or four times during subsequent refresh cycles in conventional 60 Hz or 100 Hz refresh-rate images. In one embodiment, the location of the beam is alternated between locations of a predefined rotation pattern, such that it alternates between two, three, or four locations on the scanning device.

When the location of the beam is changed on the scanning device, the resulting pixel location from the scanned beam is also changed along the projection surface. The shift in pixel position on the projection surface is proportional to the shift on the scanning device. The video data used to control the scanner can be shifted synchronously with the location change of the beam to keep the pixels, as perceived by a user, at the same position on the screen. In so doing, the beam angle relative to the scanning device will refresh each pixel from different angles, thereby introducing angular diversity and reducing perceived speckle.

Embodiments of the present invention offer many advantages over prior art speckle reduction techniques. To begin, embodiments of the invention are readily manufacturable. For example, in one embodiment that will be described below, an off-axis corner cube is used to alter a beam location on the scanning device. Such a cube can be used to introduce angular separation to reduce speckle by twenty percent or more without deleteriously affecting resolution of the resulting image.

A second advantage of embodiments of the present invention is that the overall brightness of the laser projection system is not adversely affected by the translation of beam location along the scanning device. Each pixel in the scanned image is refreshed with the normal laser beam, without the use of retarding optical coatings or devices. Overall brightness of the laser projection system remains nominally the same as when embodiments of the invention are not present. One other advantage of embodiments of the present invention can be used with other speckle mitigation techniques, such as, but not limited to, wavelength diversity or frame-to-frame averaging of uncorrelated speckle patterns techniques.

A third advantage of embodiments of the present invention is that angular diversity is introduced into a projected beam without the need for post-scan optical elements. Said differently, angular diversity is introduced during the scanning process without requiring additional optical elements, such as birefringent crystals, lenses, and the like. Additionally, the angular diversity can be introduced while preserving the relatively long depth of focus afforded by laser-based scanning systems.

Figure 2:
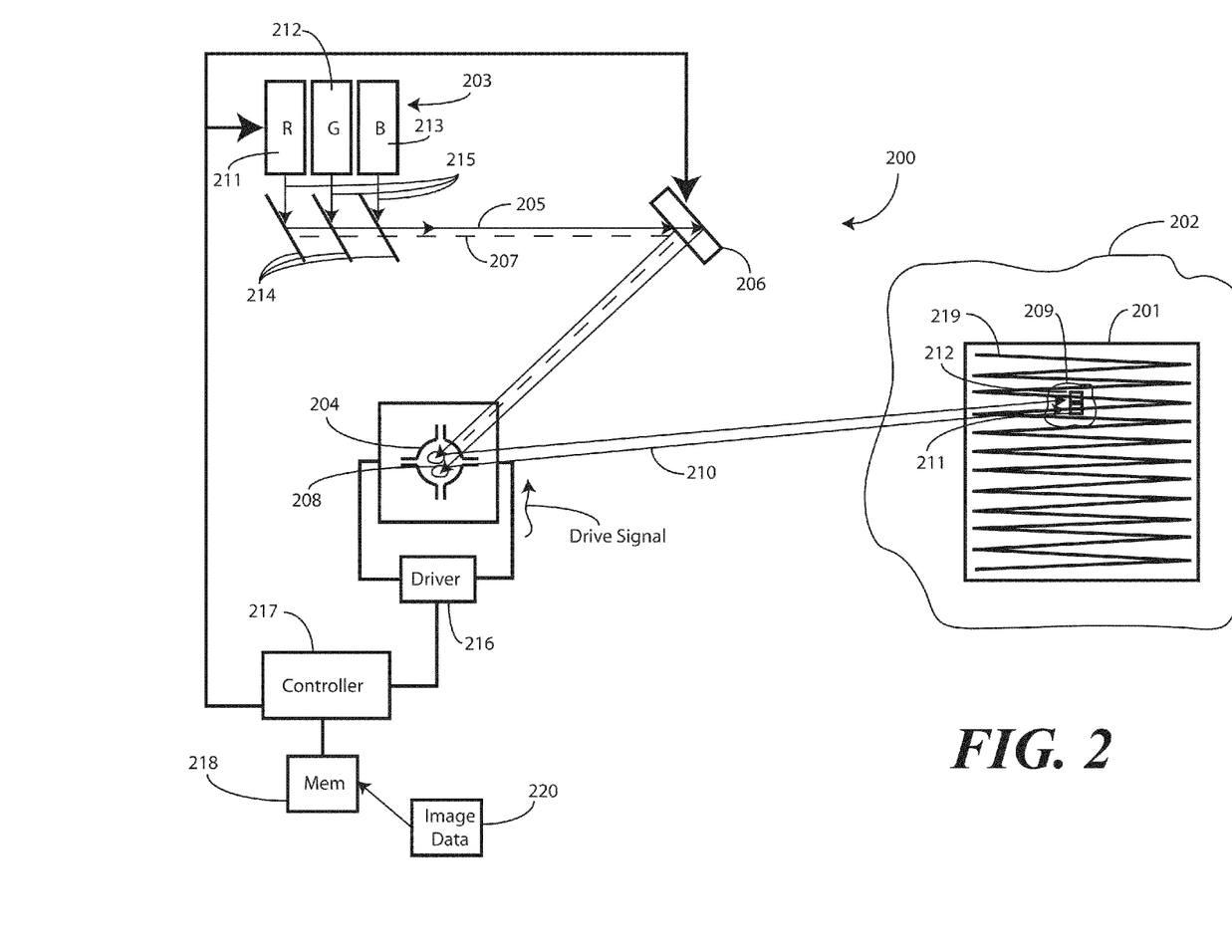
FIG. 2 illustrates one embodiment of an image projection system in accordance with embodiments of the invention.

Turning now to FIG. 2, illustrated therein is one embodiment of an imaging system 200 configured to reduce perceived speckle in images 201 produced on a projection surface 202 in accordance with embodiments of the invention. The imaging system 200 of FIG. 2 includes one or more laser sources 203, a light modulator 204, and a light translation element 206. The configuration of FIG. 2 is included for illustration and discussion purposes to aid in understanding of embodiments of the invention. It will be clear to those of ordinary skill in the art having the benefit of this disclosure that other configurations of laser projection systems can be used in accordance with embodiments of the invention without departing from the spirit and scope of the invention.

In one embodiment, the one or more laser sources 203 comprise a red laser 211, a green laser 212, and a blue laser 213, as indicated by the "R," "G," and "B" in FIG. 2. These lasers can be various types of lasers, including semiconductor lasers such as edge-emitting lasers or vertical cavity surface emitting lasers. Such semiconductor lasers are well known in the art and are commonly available from a variety of manufacturers.

To facilitate freedom of design, i.e., to permit the designer to orient the one or more laser sources 203 in different ways relative to the light modulator 204, one or more optical alignment devices 214 can be used to direct light beams 215 from the laser sources 203. The optical alignment devices 214 can also be used to orient the light beams 215 into a single light beam 205.

In one embodiment, dichroic mirrors are used as the optical alignment devices 214. Dichroic mirrors are partially reflective mirrors that include dichroic filters that selectively pass light in a narrow wavelength bandwidth while reflecting others.

Note that the location, as well as the number, of the optical alignment devices 214 can vary based upon application. For example, in some micro electromechanical (MEMS)-type scanning systems, the light beams 215 from the laser sources 203 can be modulated directly into the light modulator 204. Alternatively, some applications may not require optical alignment devices 214.

The light modulator 204 is configured to produce images 201 with light 205 from the laser sources 203 by scanning the light 205 as scanned light 210 along the projection surface 202. The light modulator 204 can be a microelectromechanical (MEMS) scanning mirror, such as those manufactured by Microvision, Inc. Examples of MEMS scanning mirrors are set forth in commonly assigned, copending U.S. patent application Ser. No. 11/775,511, filed Jul. 10, 2007, entitled "Substrate-Guided Relays for Use with Scanned Beam Light Sources," which is incorporated herein by reference, and in US Pub. Pat. Appln. No. 2007/0159673, entitled, "Substrate-guided Display with Improved Image Quality," which is incorporated herein by reference. A MEMS light modulator is well suited to embodiments of the invention due to its compact construction, cost effectiveness, and reliability. While a MEMS device will be used herein for discussion purposes, it will be clear to those of ordinary skill in the art having the benefit of the disclosure that other scanning platforms may be used as well.

The light modulator 204 is responsive to a driver 216 and a controller 217. The controller 217 can comprise one or more processors that execute instructions stored in a corresponding memory 218. The controller 217 and driver 216, in one embodiment are configured to deliver a drive signal to the light modulator 204 based upon image data 220 stored in memory 218.

In one embodiment, the driver 216 is operative to pivot the light modulator 204 about a first axis and second axis by delivering a control signal to the scanning assembly light modulator 204. This pivoting action causes the scanned light 210 to move horizontally and vertically, in one embodiment, in a raster pattern 219 to form an image. The control signal may cause the light modulator 204 to sweep the scanned light 210 horizontally at a relatively higher frequency and also vertically using relatively lower frequency components, thereby creating the raster pattern 219.

The raster pattern 219 is refreshed at an image refresh cycle. Common refresh cycles are 60 Hz and 100 Hz. When using a 60 Hz refresh cycle, for example, the image 201 will be redrawn sixty times per second.

The driver 216 can cause the light modulator 204 to sweep the scanned light 210 in accordance with image data 220 stored in the memory 218. For example, where the image data 220 is video content, each raster scan can comprise a frame of video. Where the image data 220 is a still image, each raster scan may refresh the image by redrawing it.

The light translation element 206, examples of which will be described in more detail below, is disposed along an optical path 207 defined between the laser sources 203 and the light modulator 204. The light translation element 206 is a device that is configured to, either electrically, mechanically, or combinations thereof, alter a light reception location 208 on the light modulator 204. Said differently, the light translation element 206 is configured to move the location on the light modulator 204 where light is received from the laser sources 203.

When this occurs, the location 209 of the scanned light 210 on the projection surface 202 also changes. In one embodiment, the light translation element 206 is configured to alter the light reception location 208 between image refresh cycles in an amount that causes the location 209 of the scanned light 210 to move in an integer multiple of pixels 211,212 in the image 201. Thus, when the light modulator 204 is generating a raster pattern 219, the light translation element 206 may be configured, for example, to alter the light reception location 208 during flyback period of the raster pattern 219.

In one embodiment, to keep the resulting image 201 from shifting by the corresponding number of pixels and appear blurry, the controller 217 can be configured to translate the image data 220 to correspond with the amount of translation of the light reception location 208 due to the action of the light translation element 206. This can be done in synchrony with the image refresh cycle of the imaging system 200. Said differently, when the light translation element 206 moves the light reception location 208 by an amount that causes a one pixel translation in the image 201, the controller 217 can be configured to make a corresponding translation of the image data such that the information presented in a pixel of the image 201 stays the same from refresh sweep to refresh sweep. This results in images generated by successive scans of the light modulator 204 to remain stable regardless of how the light translation element 206 alters the light reception location 208.

In one embodiment, the light translation element 206 is configured to alter the light reception location 208 in accordance with a predefined pattern. For example, in one embodiment, the light translation element 206 could be configured to alternate the light reception location 208 between a first location and a second location such that odd refresh sweeps are made with the light in a first reception location and even refresh sweeps are made with the light in a second reception location.

It will be clear to those of ordinary skill in the art having the benefit of this disclosure that the number of partially uncorrelated states that are suitable for use to reduce perceived speckle depends upon the refresh rate. This constitutes a design constraint when employing embodiments of the invention.

For instance, where the light modulator 204 is configured to present images by sweeping in a raster pattern 219, the human eye will average successive sweeps. To prevent the appearance of flicker, only a certain number of frames can be averaged in the speckle reduction process. Thus, the predefined pattern used by the light translation element 206 will not have an unlimited number of light reception locations. The number of light reception locations will depend upon the refresh rate and the visual integration time of the observer.

Estimates of observer integration time in which flicker or other artifacts are not perceived are generally around 50-60 milliseconds. Thus, when images change in a shorter period of time, the artifacts will not be noticed. However, when they change across a longer period of time, artifacts may be noticed. Thus, the designer must take this into consideration when determining the number of light reception locations that can be used by the light translation element 206.

Illustrating by way of example, when the light modulator 204 is configured to refresh the image 201 by sweeping a raster pattern 219 with a refresh rate of 60 Hz, the integration of four consecutive frames requires an integration time superior or equal to 67 milliseconds from the observer. Thus, if the light translation element 206 is configured to alternate between four light reception locations between refresh frames, a user may perceive visible artifacts. However, if the refresh rate is 100 Hz, the integration of four consecutive frames requires an integration time superior or equal to 40 milliseconds from the observer. Accordingly, the light translation element 206 can be configured to alternate between four light reception locations without perceptible artifacts.

If three light reception locations are used in the predefined pattern, where the refresh rate is 60 Hz, the integration of three consecutive frames requires an integration time superior or equal to 50 milliseconds from the observer, which is on the cusp of visible perception. Accordingly, a user may perceive some flicker. A designer may therefore elect to use two light reception locations when the refresh rate is 60 Hz. By contrast, where the refresh rate is 100 Hz, the integration of three consecutive frames requires an integration time superior or equal to 30 milliseconds from the observer. Thus, no flicker will be perceived.

When the refresh rate is 100 Hz, a designer may use four light reception locations in the predefined pattern, as the observer minimum integration time to avoid flickering artifacts is only 40 milliseconds. Visible artifacts will therefore be all but imperceptible. By contrast, a refresh rate of 60 Hz results in an observer minimum integration time of 67 milliseconds, which means flickering artifact will be visible for most users.

While refresh rate is one design consideration, another is the size of the light modulator. In one embodiment of the invention, the diameter of the light beam delivered to the light modulator 204 is less than the diameter of the light modulator 204. This permits the light reception location 208 to move across the surface of the light modulator 204 without overlapping and without "spilling over" the sides, thereby optimizing perceived speckle reduction. While the theoretical maximum of speckle reduction would be $1/\sqrt{N}$, wherein N is the number of light reception locations that the light translation element alternates between, practical limitations of the size of the light modulator may limit the actual number of light reception locations.

Figure 3:
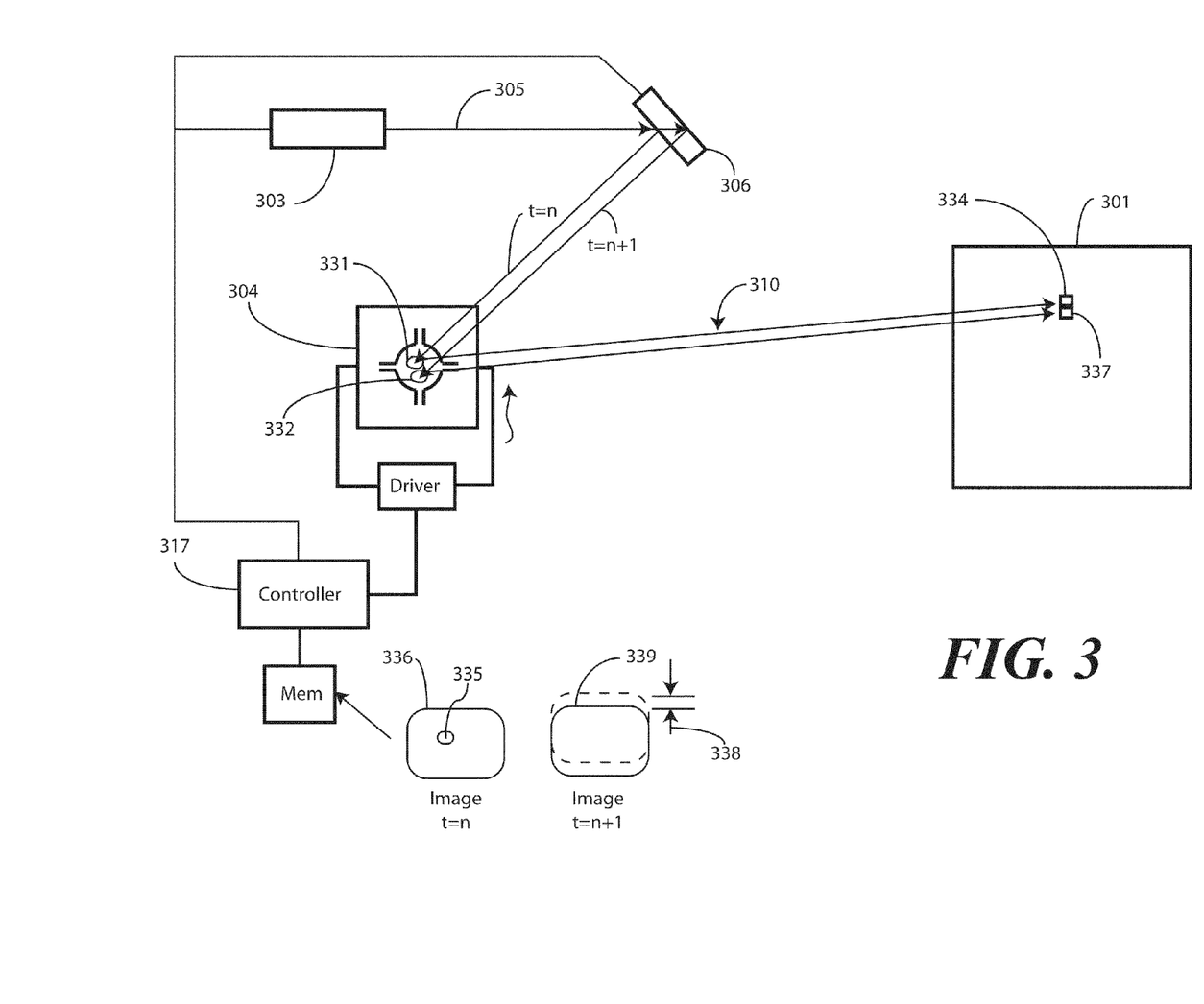
FIG. 3 illustrates another image projection system configured in accordance with embodiments of the invention.
Figure 4:
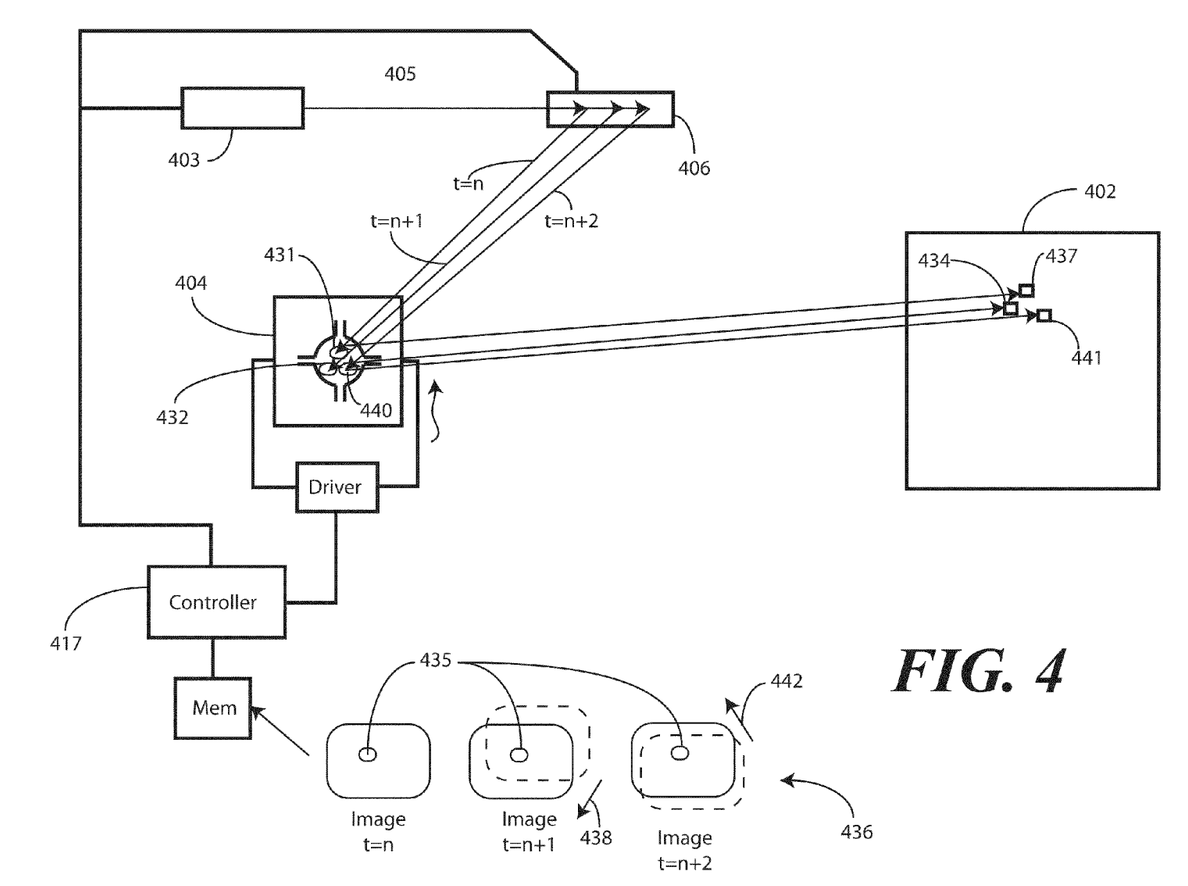
FIG. 4 illustrates another image projection system configured in accordance with embodiments of the present invention.
Figure 5:
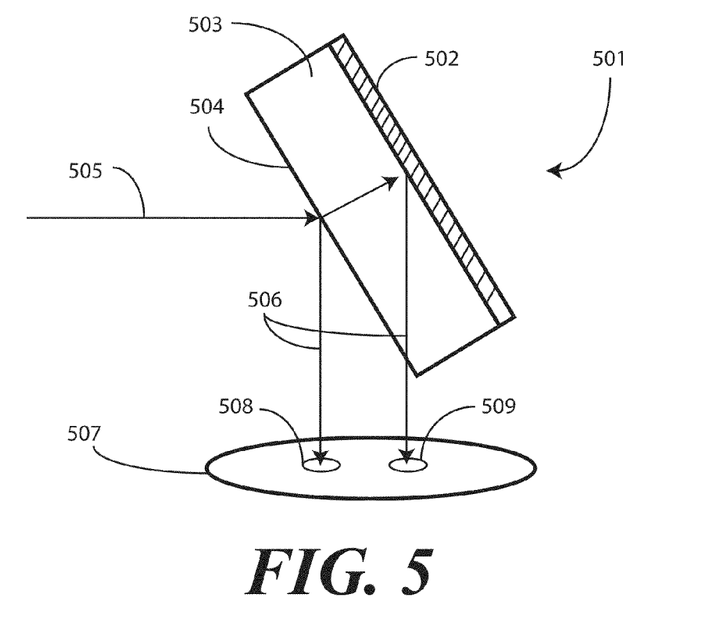
FIGS. 5-10 illustrate alternate embodiments of light translation devices configured in accordance with embodiments of the invention.

Illustrating by way of example, theoretically if the light translation element 206 alternated sequentially between ten light reception locations along the light modulator 204, the amount of speckle reduction that results would be greater than when the light translation element 206 alternated between three light reception locations. (A fast refresh rate would be needed when using ten light reception locations to mitigate visible artifacts.) However, to alternate between ten light reception locations, a significantly larger light modulator 204 would be required. Additionally, an increase in angular separation can compromise the depth of focus of the overall system. For this reason, a designer may elect to keep the number of light reception locations through which the light translation element 206 alternates smaller to keep the overall imaging system 200 smaller as well. Additionally, a designer may permit the various light reception locations to overlap along the surface of the light modulator 204 to keep the overall size small as well. Turning now to FIGS. 3-5, illustrated therein are examples of imaging systems where the light translation element is configured to alternate between some illustrative predetermined numbers of locations.

Beginning with FIG. 3, illustrated therein is an imaging system having one or more light sources 303, a light translation element 306, and a light modulator 304 as described above. In the illustrative embodiment of FIG. 3, the light translation element 306 is configured to alternate between a first light reception location 331 and a second light reception location 332. In the illustrative embodiment of FIG. 3, the light translation element 306 is configured to do this between image refresh cycles, in synchrony with the image refresh rate.

The light translation element 306 first directs the light 305 to a first light reception location 331 on the light modulator 304. The light modulator 304 then creates the image, causing the scanned light to pass through a first pixel 334 at location 335 of the image data 336 stored in memory.

Once a full sweep of the image has occurred, the light translation element 306 directs the light 305 to a second light reception location 332 on the light modulator 304. The light modulator 304 then refreshes the image, or in the case of video, sweeps so as to create another image.

Since the light reception location on the light modulator 304 has changed, when the light modulator directs the scanned light to present location 335 of the image data 336, it now falls on pixel 337 due to the change in angle. In the illustrative embodiment of FIG. 3, the light translation element 306 is configured to alter the location light is delivered to the light modulator 304 by an amount sufficient to cause the scanned light 310 to move in integer pixel increments 333. In FIG. 3, the integer is one.

To keep the image stable, one or more processors 317 shift 338 the image data 336 by a corresponding pixel to form shifted image data 339. Accordingly, the image stays stable as the projected information shifts in memory in an amount that corresponds and is proportional to the amount of translation of the light reception location along the light modulator 304.

Where the light modulator 304 is configured to create the image 301 by moving in a raster pattern, the light translation element 306 can be configured to move the light 305 from the first light reception location 331 to the second light reception location 332 between each raster sweep of the raster pattern. As the predetermined number of light reception locations in this example is two, the number of frames averaged by a viewer will be two. The light translation element 306 can be configured in accordance with embodiments of the invention to alter the light reception locations along either the scanning direction of the light modulator 304 or, alternatively, along a direction normal to the scanning direction of the light modulator 304. In FIG. 3, since the image 301 is being created by a raster sweep, the alteration is occurring normal to the scanning direction.

In the illustrative embodiment of FIG. 3, the light translation element 306 is configured to move the light 305 vertically along the surface of the light modulator 304. Experimental testing has shown that by moving a 1 millimeter diameter laser beam about 615 micrometers across the surface of the light modulator and integrating with the eye the resulting speckle patterns from these two positions results in a speckle contrast reduction of over fifteen percent. Note that the light 305 could be moved horizontally along the raster sweep as well. The choice will be made based upon application and light modulator design.

Turning now to FIG. 4, illustrated therein an imaging system 400 as shown in FIG. 3 having one or more light sources 403, a light translation element 406, and a light modulator 404 as described above. In the illustrative embodiment of FIG. 4, the light translation element 306 is configured to alternate between a predetermined number of locations on the light modulator 404, wherein the number is three. In FIG. 4, the predetermined number of light reception locations include a first light reception location 431, a second light reception location 432, and a third light reception location 433. The light modulator 404 is configured to alternate between these positions between refresh frames, as described above. While the embodiment of FIG. 3 alternated locations in integer pixel increments, the embodiment of FIG. 4 is configured to alternate locations in partial pixel increments.

The one or more processors 417 are configured to correspondingly alter the image data 436 stored in memory. In this illustrative example, when the light modulator 404 is creating a first image, the light translation element 406 is directing light 405 to a first light reception location 431. When the light modulator 404 is presenting pixel 435, it falls at location 437 on the image projection surface 402.

When the light modulator 404 is refreshing the image, or in the case of video presenting the next image, the light translation element 406 is directing light 405 to a second light reception location 432. When the light modulator is presenting pixel 435, it falls at location 434 on the projection surface 402. To keep the image stable, the one or more processors 417 shift the image data by a corresponding amount 438 in memory.

When the light modulator 404 is refreshing the image again or presenting the next image, the light translation element 406 is directing light 405 to a third light reception location 440. When the light modulator 404 is presenting pixel 435, it falls at location 441 on the projection surface 402.

To keep the image stable, the one or more processors 417 shift the image data by a corresponding amount 442 in memory. This process can then repeat, thereby presenting a three-frame set that is to be averaged by the user. Where the image refresh rate of this example is 60 Hz, the minimum integration time required for the three-frame set to run without flickering artifacts is 50 milliseconds. Conversingly, where the image refresh rate is 100 Hz, the minimum integration time required from the observer becomes thirty milliseconds.

Experimental testing has shown that by moving a 1 millimeter diameter laser beam in a triangular pattern having legs of between 600 micrometers and 650 micrometers across the surface of the light modulator results in a speckle contrast reduction of over twenty percent. The embodiment of FIG. 4 will generally require a larger light modulator surface for optimum results that the embodiment of FIG. 3. However, adequate speckle reduction can be obtained without excessive increases in scanning mirror size.

While FIG. 3 illustrated a light translation element configured to alternate between two light reception locations, and FIG. 4 illustrated a light translation element configured to alternate between three light reception locations, the light translation element can be configured to alternate between other predetermined numbers of locations along the light modulator as well. For example, in another embodiment, the predetermined number of locations is four.

Where a predetermined number of locations is employed, the choice in number will depend on the application, refresh rate, and other considerations. For example, if a designer were to choose three locations, such an embodiment introduces an angular separation that is constant as the light translation element moves the light beam from light reception location to light reception location. Further, a three-location set will help to minimizes pixel growth over a screen distance of 500 millimeters to two meters when a MEMS scanner is used as the light modulator, preserving semi-infinite depth of focus. As the integration time is smaller, the use of three locations can result in less visible artifacts as well.

By contrast, the use of four light reception locations will generally offer increased speckle reduction. Further, another benefit associated with the use of two or more light locations is the increase in the perceived beam diameter at the light modulator, helping with laser safety requirements (cf C6 requirements in *Safety of laser products, IEC 60825-1 Second Edition* 2007-03). This is because a bigger effective "beam footprint" on the scanner is created with the introduction of angular diversity. This beam footprint size is directly related to the C6 coefficient. By increasing the beam footprint, for a given beam power, the safety margin of the laser scanner is increased. Alternatively, it permits the power of the laser beam to be increased while still maintaining the same level of laser safety. As will be shown below when describing examples of light translation elements, alternating between four light reception locations can be accomplished more economically as well.

Turning now to FIGS. 5-10, illustrated therein are various exemplary light translation elements suitable for use with embodiments of the invention. The embodiments of FIGS. 5-10 are illustrative only, and are not intended to be limiting. It will be clear to those of ordinary skill in the art having the benefit of this disclosure that other mechanical, electronic, or electromechanical solutions may be substituted.

Each light translation element can be configured to be operable as a "beam shifter" that is configured to selectively shift a beam location of light along a light modulator. Where, for example, the light modulator is an electromechanically controllable scanning assembly, such as a MEMS scanning mirror, each light translation element can be configured to physically alter the location along the scanning mirror of a light beam coming from one or more laser sources. As noted above, the alteration of light reception location can be performed between sweeps of an image forming pattern, such as a raster pattern. The alteration of light reception location introduces angular diversity in the light projecting the image, thereby reducing perceived speckle in the images.

Beginning with FIG. 5, illustrated therein is an electrically addressable high/low reflectivity layered mirror 501 suitable for use as a light translation element in accordance with embodiments of the invention. The electrically addressable high/low reflectivity layered mirror 501 includes a reflective surface 502 and an layer of optical media 503 defining an optical path distance or gap. The optical media 503 can be a simple isotropic material such as glass. The front surface 504 of the optical media 503 is configured as an electrically "switchable" material that can be configured to reflect light from the front surface 504 in a first electrically controllable state, or, in another electrically controllable state, permit the light to pass through the optical media 503 to the reflective surface 502. Examples of electrically switchable materials include electronically-addressable Fabry-Perot gap devices or electrically controllable electrochromic layers. When in the first state, incoming light 505 received from a laser source is reflected from the front surface 504. In the second state, incoming light 504 is reflected from the reflective surface 502. The resulting beam 506 is delivered to the scanning assembly 507.

For example, when the electrically addressable high/low reflectivity layered mirror 501 is in a first state, the front surface 504 is highly reflective. As such, the incoming beam 505 is reflected off the front surface 504 and delivered to the scanning assembly 507 at a first location 508. When the electrically addressable high/low reflectivity layered mirror 501 is in the second state, the incoming beam 505 is transmitted through the electrically switchable media 503. The incoming beam 505 therefore reflects off the reflective surface 502, and is delivered to the scanning assembly 507 at a second location 509.

Figure 6:
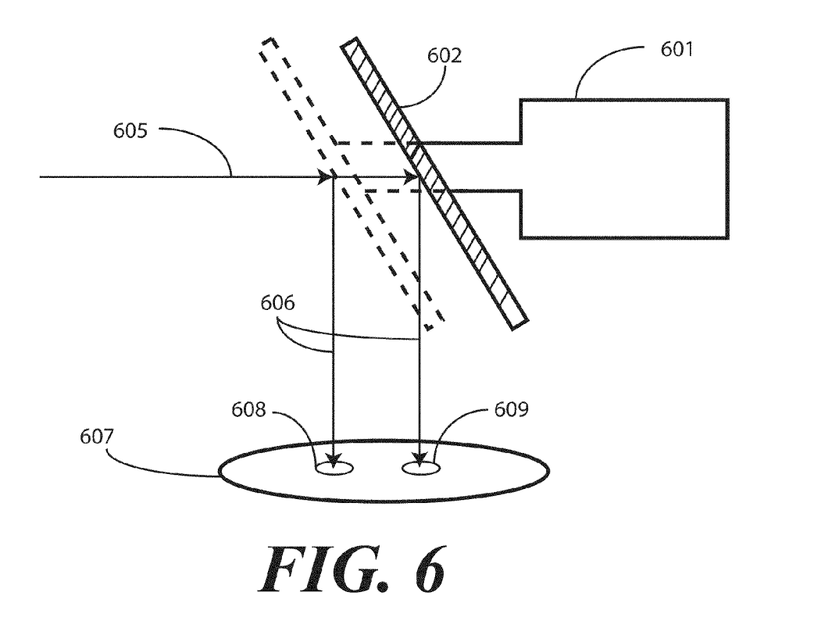

Turning now to FIG. 6, illustrated therein is an electromechanical solution. Specifically, the light translation element is configured as a mirror 602 coupled to an electromechanical actuator 601. In the illustrative embodiment of FIG. 6, the electromechanical actuator 601 is a piezoelectric transducer. The piezoelectric transducer is configured to move between one of a plurality of positions, thereby selectively altering the physical location of the resulting beam 606 on a scanning assembly 607.

Using a two-location example for illustration, when the electromechanical actuator 601 is moved to a first position, the mirror 602 reflects an incoming beam 605 to the scanning assembly 607 at a first location 608. When the electromechanical actuator 601 is moved to a second position, the mirror 602 reflects the incoming beam 605 to the scanning assembly 607 at a second location 609.

Figure 7:
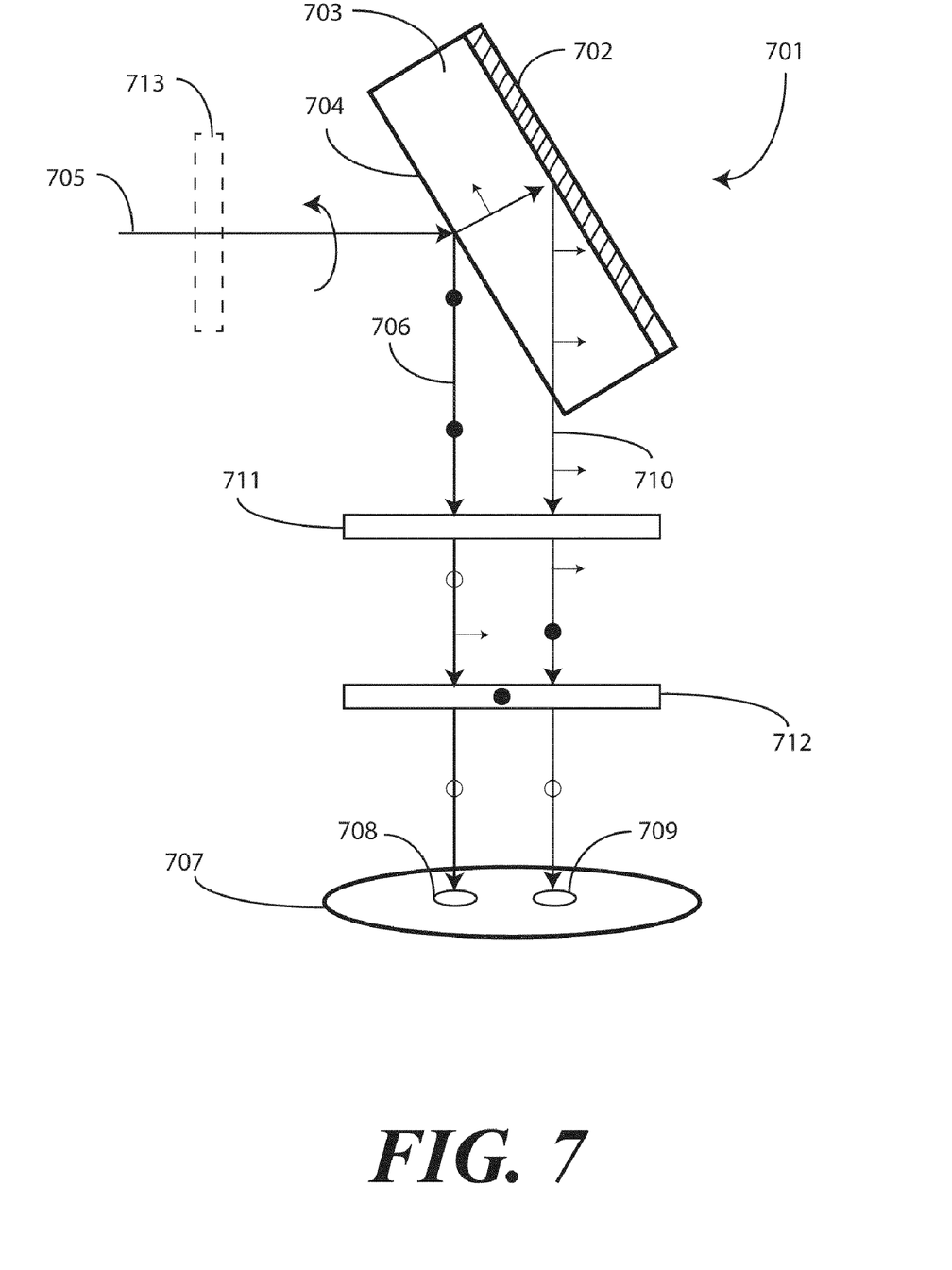

Turning now to FIG. 7, illustrated therein is another embodiment of a light translation element 701 configured in accordance with embodiments of the invention. In FIG. 7, the light translation element 701 is configured as a mirror 702 and polarizing beam splitter 703 working in tandem. The polarizing beam splitter 703 separates the received laser beam 705 into two different polarization beams 706, 710.

A first polarization beam 706 is reflected off the front surface 704 of the polarizing beam splitter 703 to a first location 708 on the scanning assembly 707. The second polarization beam 710 passes through the polarizing beam splitter 703 to the mirror 702. The second polarization beam 710 therefore reflects to a second location 709 on the scanning assembly 707.

The polarization states can be established in multiple ways. For example, in one embodiment, the polarization states of the incoming light can be selectively alternated by an ninety degrees polarization rotator 713. In another embodiment, the input beam 705 is circularly polarized or linearly polarized at a forty-five degree angle relative to the polarization axis of the polarizing beam splitter 703 and a ninety-degree polarization rotator 711 and polarizer 712 can be placed in the optical path of each of the first polarization beam 706 and the second polarization beam 710 to ensure that each beam again has the same polarization when reflecting off the scanning assembly 704.

Figure 8:
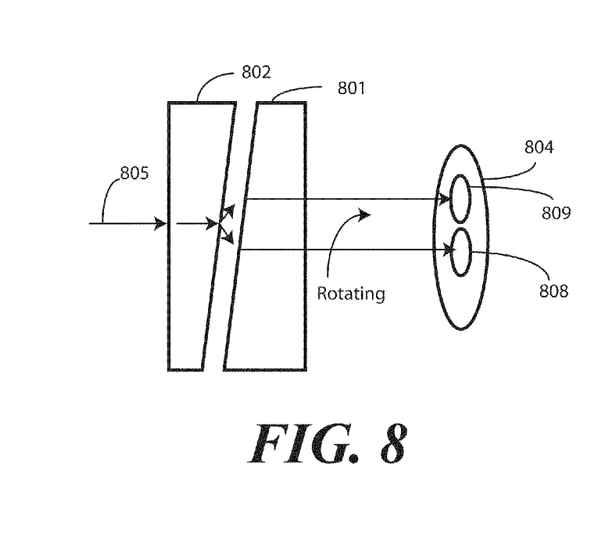

Turning now to FIG. 8, illustrated therein is another embodiment of a light translation element. In FIG. 8, the light translation element comprises a first wedge 801 and a second wedge 802. Both wedges are capable of rotation.

As is known in the art, a dual-wedge assembly with an air gap introduces the beam translation. A first wedge 801 and a second wedge 802, which may be manufactured from an isotropic material such as glass, are separated by an air gap therebetween. The air gap is responsible for shifting the beam between the first wedge 801 and second wedge 802. A designer can tailor the dual-wedge assembly to establish a predetermined amount of translation based upon wedge angles, the air gap, the thickness of the wedges, and index of the wedge material.

By rotating the two-wedge assembly 801,802, the optical path of received light 805 can be altered between multiple locations 808,809 on a scanning assembly 804. One advantage offered by the embodiment of FIG. 8 is that rotation of both wedges 801,802 can vary the location of light across many locations on the scanning assembly 804. Thus, when a designer wants a light translation element that is configured to alternate between three or four locations on the scanning assembly 804, the embodiment of FIG. 8 makes this easily possible.

Figure 9:
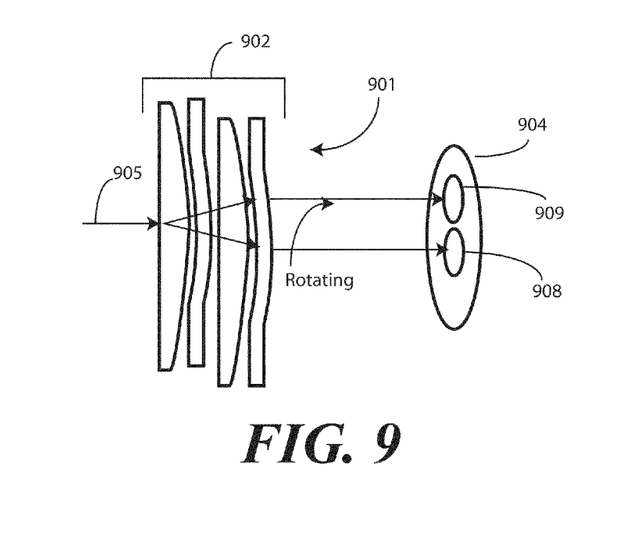

Turning now to FIG. 9, illustrated therein is a light translation element 901 that operates in a manner similar to that shown in FIG. 8. In FIG. 9, a plurality of lenses 902 is provided, with each lens of the assembly being capable of rotation as a group. By rotating the lenses together, the optical path of received light 905 across multiple locations 908,909 on a scanning assembly 904. As with the embodiment of FIG. 8, the plurality of lenses 902 shown in FIG. 9 can vary the location of light across many locations on the scanning assembly 904.

Figure 10:
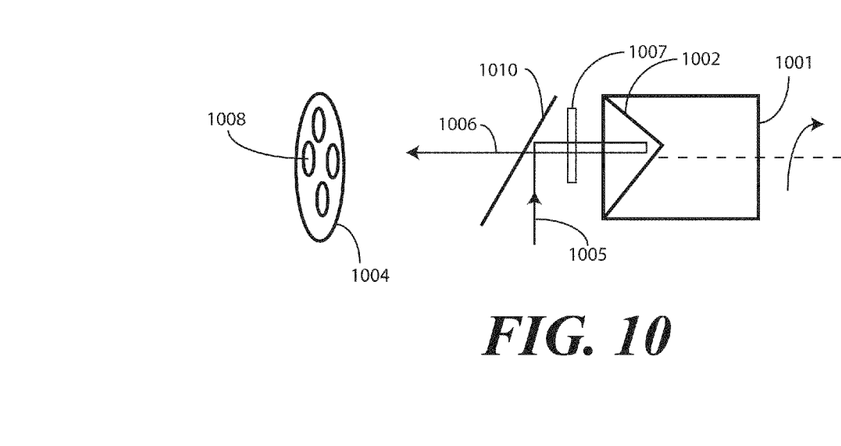

Turning now to FIG. 10, illustrated therein is yet another light translation element configured in accordance with embodiments of the invention. The light translation element of FIG. 10 is configured as a rotatable optical corner cube 1001 having an off-axis reflective surface 1002 therein. By rotating the optical corner cube 1001, received light 1005 can be reflected off different portions of the off-axis reflective surface 1002 to one of a variety of locations 1008 on a scanning assembly 1004.

In one embodiment, the rotatable optical corner cube 1001 works in conjunction with a polarizing beam splitter 1010. The polarizing beam splitter 1010 is configured to reflect the incoming linearly-polarized light 1005 to the off-axis reflective surface 1002, but permit the orthogonally-polarized reflected light 1006 to pass through to the scanning assembly 1004 where, in one embodiment, the ninety-degrees polarization rotation is achieved thanks to the light 1005 passing twice through a quarter wave plate 1007. The optical axis of the quarter-wave plate 1007 has been aligned to achieve the appropriate amount of polarization rotation.

To this point, the issue of focus has not been discussed. Practically speaking, scanned laser-based projection systems such as those manufactured by Microvision, Inc. have a depth of focus that is sufficiently relatively long (tens of meters). Accordingly, focus from such projection systems will be essentially unaffected by minor variation in the light reception location on the scanning assembly. However, some configurations or other applications may be sensitive enough that focus is effective when the light reception location is altered.

Figure 11:
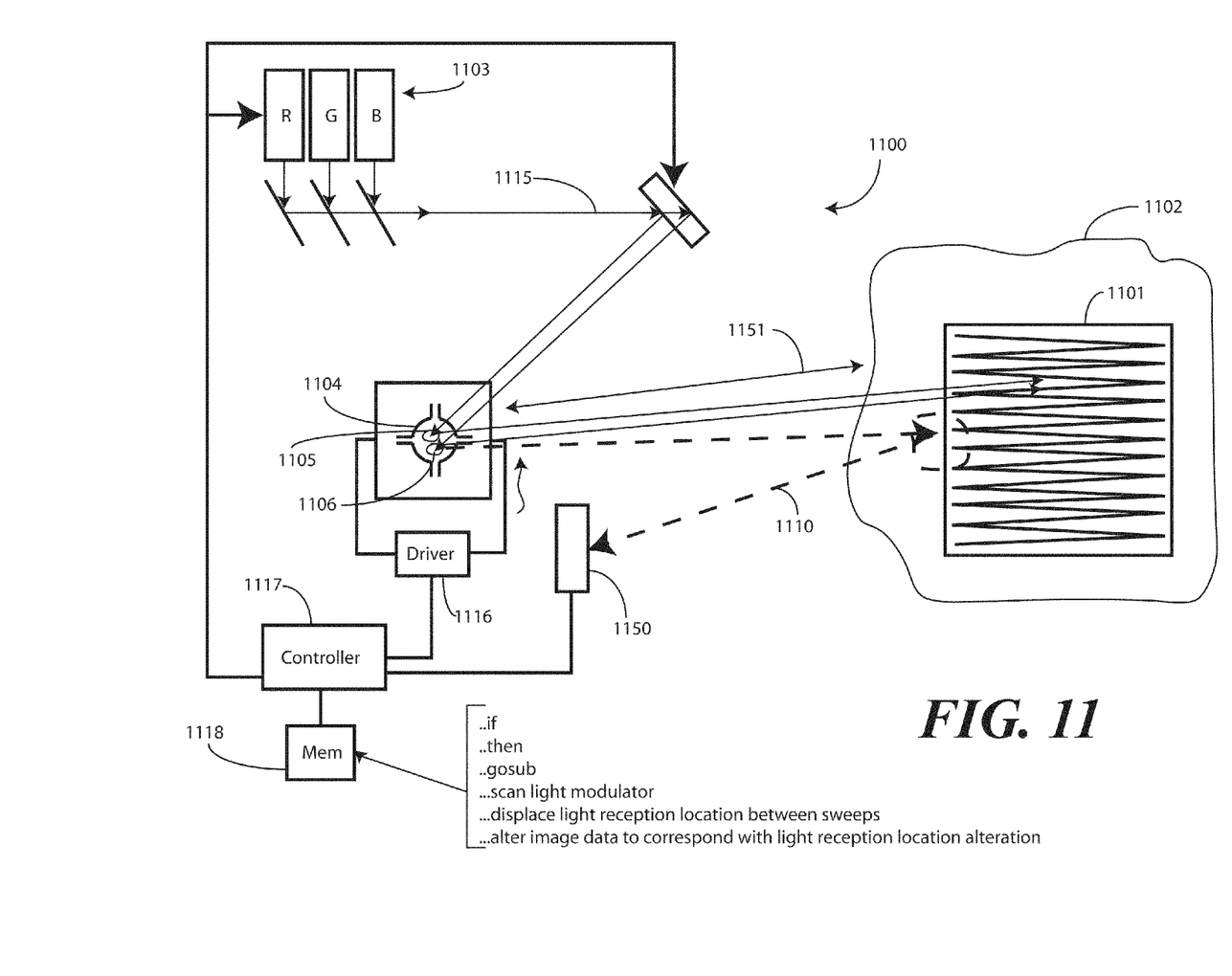
FIG. 11 illustrates another image projection system configured in accordance with embodiments of the invention.

Turning now to FIG. 11, illustrated therein is one embodiment of the invention configured to address these applications.

In FIG. 11, a laser scanning imaging system 1100 is capable of not only projecting images 1101 on a projection surface 1102, but is also capable of determining a distance 1110 between the imaging system 1100 and the projection surface 1102 as well. Conceptually, since the shifted beams are incident on a given image plane pixel from different angles, the amount of shift in the video channel needed to make them overlap depends on the distance 1110 to the projection surface 1102. To optimize for changing projection distances, if the distance is known, i.e., if the distance is determined by a controller 1117 and a distance detector 1150, the shift in the video channel or the beam separation can be adjusted appropriately by the controller 1117.

As shown in FIG. 11, the imaging system 1100 includes one or more laser sources 1103 configured to selectively produce one or more light beams 1115. A light modulator 1104 is responsive to a driver 1116 and a controller 1117. The controller 1117 executes instructions stored in a corresponding memory 1118 for performing the functions of the imaging system 1100. These functions, if recited as steps of a method, include scanning the light modulator 1104 in a sweeping pattern to generate an image, selectively causing displacement of a location light is projected between refresh sweeps by selectively altering a light reception location on the light modulator 1104, and correspondingly altering image data used to scan the light modulator 1104 synchronously with the selectively displacement of the light reception location in an amount proportional to a displacement of the light reception location as described above.

The difference between FIG. 11 and, for example, FIG. 2, lies in the addition of a distance detector 1150. The distance detector 1150, which can be configured for example as a photodetector, is configured to detect reflected light 1110 from the projection surface 1102. The distance detector 1150 can then convert this received light into analog or digital signals indicative of, for example, location and intensity. The signals are then delivered to the controller 1116. The controller 1116 can then determine the distance 1151 between the projection surface 1102 and the imaging system 1100. Once the distance is known, it can be continually monitored. Accordingly, the "video shift distance," i.e., the amount the video content must be shifted in memory, or the beam separation distance, can be shifted as the distance 1151 changes so as to keep the image 1101 in focus as necessary.

For example, the beam separation can be adjusted in response to the determination of the distance 1151. For example, the amount of separation between beam 1105 and beam 1106 can be adjusted based upon the determined distance so that both beams 1105,1106 intersect on the projection surface 1102 with a constant difference in their respective angle of incidence. In so doing, the amount of speckle reduction remains constant across the image 1101 as the distance 1151 changes.

Alternatively, the separation between beam 1105 and beam 1106 can be kept constant as the distance 1151 changes. In this scenario, the difference between their respective angles of incidence will be changed so that beam 1105 and beam 1106 still intersect on the projection surface 1102 as the distance 1151 changes. This is achieved by changing the pixel offset in the controller 1117, based on the determined distance 1151. The amount of speckle reduction will vary under this scenario, but the speckle contrast ratio will still be reduced.

In the foregoing specification, specific embodiments of the present invention have been described. However, one of ordinary skill in the art appreciates that various modifications and changes can be made without departing from the scope of the present invention as set forth in the claims below. Thus, while preferred embodiments of the invention have been illustrated and described, it is clear that the invention is not so limited. Numerous modifications, changes, variations, substitutions, and equivalents will occur to those skilled in the art without departing from the spirit and scope of the present invention as defined by the following claims. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims.

What is claimed is:

1. An imaging system configured to reduce perceived speckle in images produced by the imaging system, the imaging system comprising:
    one or more laser sources;
    a light modulator configured to produce the images with light from the one or more laser sources by scanning the light along a projection surface; and
    a light translation element disposed in an optical path defined between the one or more laser sources and the light modulator, wherein the light translation element is configured to alter a light reception location where the light is received from the one or more laser sources on the light modulator, wherein the light translation element is configured to alter the light reception location in synchrony with an image refresh cycle of the imaging system.

2. The imaging system of claim 1, wherein the light translation element is configured to alternate between a predetermined number of locations on the light modulator, wherein the predetermined number of locations is one of two, three, or four.

3. The imaging system of claim 2, wherein the light modulator is configured to produce the images by moving substantially in a raster pattern, wherein the light translation element is configured to move the light to another of the predetermined number of locations between each raster sweep of the raster pattern.

4. The imaging system of claim 1, wherein the light translation element is configured to increase the C6 coefficient of the imaging system.

* * * * *